(12) United States Patent
Fowler

(10) Patent No.: US 9,293,048 B2
(45) Date of Patent: Mar. 22, 2016

(54) METHOD FOR EFFICIENT DYNAMIC ALLOCATION OF VEHICLES TO INDEPENDENT PASSENGERS

(71) Applicant: Eric Alan Fowler, Bellevue, WA (US)

(72) Inventor: Eric Alan Fowler, Bellevue, WA (US)

( * ) Notice: Subject to any disclaimer, the term of this patent is extended or adjusted under 35 U.S.C. 154(b) by 148 days.

(21) Appl. No.: 14/161,686

(22) Filed: Jan. 23, 2014

(65) Prior Publication Data
US 2015/0206437 A1 Jul. 23, 2015

(51) Int. Cl.
*G01C 21/34* (2006.01)
*G06Q 10/04* (2012.01)
*G08G 1/00* (2006.01)

(52) U.S. Cl.
CPC ............... *G08G 1/202* (2013.01); *G01C 21/34* (2013.01); *G06Q 10/047* (2013.01)

(58) Field of Classification Search
CPC ....... G01C 21/34; G08G 1/202; G06Q 10/047
USPC ................................................ 701/410, 482
See application file for complete search history.

(56) References Cited

U.S. PATENT DOCUMENTS

| | | | |
|---|---|---|---|
| 4,360,875 A | 11/1982 | Behnke | |
| 5,214,689 A | 5/1993 | O'Sullivan | |
| 5,272,638 A | 12/1993 | Lineberry et al. | |
| 5,604,676 A | 2/1997 | Penzias | |
| 6,751,548 B2 | 6/2004 | Fox | |
| 7,080,019 B1 | 7/2006 | Hurzeler | |
| 8,438,118 B2 | 5/2013 | Ho | |
| 8,799,038 B2 * | 8/2014 | Chen et al. | 705/5 |
| 2003/0177020 A1 * | 9/2003 | Okamura | 705/1 |
| 2011/0099040 A1 * | 4/2011 | Felt et al. | 705/7.12 |
| 2013/0024249 A1 * | 1/2013 | Zohar et al. | 705/13 |
| 2013/0158861 A1 * | 6/2013 | Lerenc | 701/410 |
| 2015/0100238 A1 * | 4/2015 | CAI et al. | 701/537 |

FOREIGN PATENT DOCUMENTS

| | | | | |
|---|---|---|---|---|
| DE | 102010003610 | | 10/2011 | |
| JP | 2003233656 A | * | 8/2003 | G06F 17/60 |

OTHER PUBLICATIONS

Huang, Yan et al., "Large Scale Real-Time Ridesharing with Service Guarantee on Road Networks", arXiv:1302.6666v1 [cs.DS] Feb. 27, 2013, 13 pages.*
Ma, Shuo et al., "T-Share: A Large-Scale Dynamic Taxi Ridesharing Service", 2013 IEEE 29th International Conference on Data Engineering (ICDE), Apr. 8-12, 2013, Brisbane, Australia, pp. 410-421.*
Calvo, Roberto et al., "A Matheuristic for the Dial-a-Ride Problem", INOC 2011, LNCS 6701 (Lecture Notes in Computer Science Series, Springer-Verlag), 2011, pp. 450-463.*

(Continued)

*Primary Examiner* — Behrang Badii
*Assistant Examiner* — David Testardi

(57) ABSTRACT

The present invention may enable the efficient allocation of a plurality of vehicles (300) to a plurality of passengers (100) traveling between independent origins and destinations. In one or more embodiments, the method may collect the locations of vehicles (300), and the origins and destinations of traveling parties (100). The method may generate a set of routes that it deems superior to other known sets of routes, making use of an electronic map (202), which may provide street lengths, estimated travel times, and estimated costs along streets.

1 Claim, 22 Drawing Sheets

(56) References Cited

OTHER PUBLICATIONS

Chen, Po-Yu et al., "A Fuel-Saving and Pollution-Reducing Dynamic Taxi-Sharing Protocol in VANETs," 2010 72nd IEEE Fall Vehicular Technology Conference (VTC 2010-Fall), 2010, Sep. 6-9, 2010, 5 pages.*

Chen, Chung-Min et al., "Smart Ride Share with Flexible Route Matching", ICACT2011, 13th International Conference on Advanced Communication Technology, Feb. 13-16, 2011, pp. 1506-1510.*

Tian, Charles et al., "Noah: a Dynamic Ridesharing System", SIGMOD'13, Jun. 22-27, 2013, New York, New York, USA, 4 pages.*

Wiener, Richard, "Branch and Bound Implementations for the Traveling Salesperson Problem—Part 1", Journal of Object Technology, vol. 2, No. 2, Mar.-Apr. 2003, pp. 65-86.*

Charikar, Moses et. al; Algorigthms for Capacitated Vehicle Routing; Society for Industrial and Applied Mathematics Journal of Computing; 2001; vol. 31, No. 3, pp. 665-682.

* cited by examiner

| Position(X1) | A | X1 |
|---|---|---|
| X1 | 0 | 0 |
| A | 1 | 1 |
| a | 5 | 5 |

| Position(X1) | A | B | X1 |
|---|---|---|---|
| X1 | 0 | 0 | 0 |
| A | 1 | 1 | 1 |
| a | 5 | 5 | 5 |
| B | 5 | 10 | 10 |
| b | 5 | 14 | 14 |

| Position(X1) | A | B | X1 |
|---|---|---|---|
| X1 | 0 | 0 | 0 |
| A | 1 | 1 | 1 |
| B | 2 | 2 | 2 |
| b | 6 | 6 | 6 |
| a | 7 | 6 | 7 |

| Position(X2) | A | X1 | X2 |
|---|---|---|---|
| X2 | 0 | 0 | 0 |
| A | 2 | 0 | 2 |
| a | 6 | 0 | 6 |

| Position(X1) | A | X1 | X2 |
|---|---|---|---|
| X1 | 0 | 0 | 0 |
| A | 1 | 1 | 0 |
| a | 5 | 5 | 0 |

| Position(X1) | Position(X2) | A | B | X1 | X2 |
|---|---|---|---|---|---|
| X1 | X2 | 0 | 0 | 0 | 0 |
| A | X2 | 1 | 1 | 1 | 0 |
| B | X2 | 2 | 2 | 2 | 0 |
| b | X2 | 6 | 6 | 6 | 0 |
| a | X2 | 7 | 6 | 7 | 0 |

| Position(X1) | Position(X2) | A | B | X1 | X2 |
|---|---|---|---|---|---|
| X1 | X2 | 0 | 0 | 0 | 0 |
| A | B | 1 | 1 | 1 | 1 |
| a | b | 5 | 5 | 5 | 5 |

| Position(X1) | A | B | X1 |
|---|---|---|---|
| X1 | 0 | 0 | 0 |
| A | 5 | 1 | 1 |
| a | 25 | 5 | 5 |
| B | 25 | 10 | 10 |
| b | 25 | 14 | 14 |

| Position(X1) | A | B | X1 |
|---|---|---|---|
| X1 | 0 | 0 | 0 |
| A | 5 | 1 | 1 |
| B | 10 | 2 | 2 |
| b | 30 | 6 | 6 |
| a | 35 | 6 | 7 |

| Position(X1) | A | B | X1 |
|---|---|---|---|
| X1 | 0 | 0 | 0 |
| B | 1 | 2 | 1 |
| A | 2 | 4 | 2 |
| a | 6 | 12 | 6 |
| b | 6 | 14 | 7 |

| Position(X1) | A | B | X1 |
|---|---|---|---|
| X1 | 0 | 0 | 0 |
| A | 1 | 2 | 1 |
| B | 2 | 4 | 2 |
| b | 6 | 12 | 6 |
| a | 7 | 12 | 7 |

| Position(X1) | A | B | X1 |
|---|---|---|---|
| X1 | 0 | 0 | 0 |
| A | 4 | 4 | 4 |
| a | 5 | 5 | 5 |
| B | 5 | 10 | 10 |
| b | 5 | 14 | 14 |

| Position(X1) | A | B | X1 |
|---|---|---|---|
| X1 | 0 | 0 | 0 |
| B | 1 | 1 | 1 |
| b | 5 | 5 | 5 |
| A | 8 | 5 | 8 |
| a | 9 | 5 | 9 |

| Position(X1) | A | B | X1 |
|---|---|---|---|
| X1 | 0 | 0 | 0 |
| A | 1 | 1 | 1 |
| B | 3 | 3 | 3 |
| b | 7 | 7 | 7 |
| a | 9 | 7 | 9 |

| Position(X1) | Position(X2) | A | B | X1 | X2 |
|---|---|---|---|---|---|
| Z | X2 | 0 | 0 | 0 | 0 |
| B | X2 | 1 | 1 | 1 | 0 |
| b | X2 | 5 | 5 | 5 | 0 |
| a | X2 | 7 | 5 | 7 | 0 |

| Position(X1) | Position(X2) | A | B | X1 | X2 |
|---|---|---|---|---|---|
| Z | X2 | 0 | 0 | 0 | 0 |
| a | B | 5 | 1 | 5 | 1 |
| a | b | 5 | 5 | 5 | 5 |

| Position(X1) | A | X1 |
|---|---|---|
| X1 | 0 | 0 |
| A | 1 | 1 |
| a | 5 | 5 |

| Position(X1) | A | B | X1 |
|---|---|---|---|
| Z | 0 | 0 | 0 |
| a | 3 | 3 | 3 |
| B | 3 | 8 | 8 |
| b | 3 | 12 | 12 |

| Position(X1) | A | B | X1 |
|---|---|---|---|
| Z | 0 | 0 | 0 |
| B | 2 | 2 | 2 |
| b | 6 | 6 | 6 |
| a | 8 | 6 | 8 |

| Position(X1) | Position(X2) | A | B | X1 | X2 |
|---|---|---|---|---|---|
| X1 | X2 | 0 | 0 | 0 | 0 |
| A | X2 | 1 | 1 | 1 | 0 |
| B | X2 | 2 | 2 | 2 | 0 |
| a | X2 | 4 | 4 | 4 | 0 |
| b | X2 | 4 | 6 | 6 | 0 |

| Position(X1) | Position(X2) | A | B | X1 | X2 |
|---|---|---|---|---|---|
| X1 | X2 | 0 | 0 | 0 | 0 |
| A | between X2 and hub | 1 | 1 | 1 | 1 |
| B | hub (awaiting B) | 2 | 2 | 2 | 2 |
| hub (B-) | hub (B+) | 3 | 3 | 3 | 3 |
| a | b | 4 | 4 | 4 | 4 |

METHOD FOR EFFICIENT DYNAMIC ALLOCATION OF VEHICLES TO INDEPENDENT PASSENGERS

BACKGROUND OF THE INVENTION (1) Field of the Invention

The invention pertains to the field of allocating vehicles to persons desiring transportation (2) Description of the Related Art Providers of surface transportation are faced with the problem of carrying independent passengers from separate origins to separate destinations using a limited number of vehicles. Such providers wish to deliver their passengers within the shortest possible time, and to minimize the time, distance, or cost accrued by the vehicles and by the passengers they serve.

Most schemes for delivery of passengers involve either fixed, prearranged routes, or the on-demand service of single passengers. In the case of fixed routes (typically served by buses, but also including trains, airplanes, or other vehicles), a passenger must find a carrier that is traveling to the general area of his destination, and he must arrange to embark at a prearranged time and fixed place. The carrier must also commit resources (vehicles and operators) to routes without knowing in advance if any passengers need to be served, or if the vehicles employed are sufficient to carry the number of passengers desiring travel. Vehicles on fixed routes do have the advantage of carrying multiple unrelated passengers at a time, harvesting lower costs per passenger; however, the passenger's overall journey is usually completed slowly because the passengers' travel plans must be matched with the fixed routes and schedules of the provider.

On the other hand, on-demand transportation (notably taxicabs) is available more quickly, but providers are less able to carry passengers with different origins or destinations in the same vehicle at the same time. Moreover, such providers usually lack an efficient method for allocating vehicles to passengers in such a way that minimizes both passenger travel time and the time the vehicles must travel to serve them, which increases the cost of the service significantly, and the time it takes for the passengers to receive service. While it would behoove such providers to reduce costs by carrying passengers with different origins and/or destinations in the same car—essentially, sharing a car—they struggle to do so while at the same time delivering prompt service to all of their passengers. In particular, they find it difficult to allocate the vehicles available among the persons desiring service. Even if the carriers are able to allocate passengers among vehicles in advance, any new passengers requesting service while the vehicles are already enroute may not receive service until after the vehicles serve all the current passengers; and new vehicles coming into service when existing vehicles are already serving passengers might not be deployed promptly. Moreover, passengers on a vehicle suffering a breakdown, or designated to be served by a vehicle which breaks down (or is otherwise rendered unavailable) before meeting them are left without effective service by carriers operating using existing methods.

Numerous attempts have been made to streamline transportation by better matching travelers with vehicles. One such attempt is described in DE102010003610 A1 (Barnickel, et. al., hereafter "Barnickel"). Barnickel's approach is to permit a driver to designate a range of times or distances within which s/he is willing to detour to pick up an additional passenger. Passengers specify either a time to be picked up or dropped off, or range of "tolerances" (describing ranges either of time or of place) within which they would be willing to accept a ride from a carpool provider. This approach suffers a disadvantage in that the passenger is not guaranteed a ride if the tolerances do not match: if the only car available cannot make the pickup within the passenger's range of tolerances, the passenger is denied service. Barnickel's approach does not seek to optimize either passenger travel time or the car's driving time: rather, it either permits or denies rides on the basis of meeting certain fixed criteria. If several rides fit Barnickel's criteria, Barnickel's approach will not choose the best match among them, but will merely make one or more minimally acceptable matches. If a new car becomes available after a passenger has been matched with a car, Barnickel's method will not allocate that car to that passenger, even if doing so would provide superior service.

U.S. Pat. No. 5,214,689 A (O'Sullivan) describes a method of matching passengers with vehicles, but requires that the vehicles transit a fixed station, and that passengers either embark or disembark there.

U.S. Pat. No. 6,751,548 B2 (Boulard and Fox) describes a ride matching scheme that makes use of straight-line distance between points. This is not the same as using time as calculated by speed limits or other road information. In cases where actual distance traveled varies from straight-line distance (such as in rides spanning both sides of a river, with the nearest bridge at some distance), this method will suffer inaccuracy and fail to deliver optimal efficiency.

U.S. Pat. No. 7,080,019 B1 (Hurzeler) describes a method by which people traveling may locate other people traveling in the same area. It does not permit rerouting of vehicles already in motion, and does not guarantee that an acceptable match will be made even if vehicles are active.

Likewise U.S. Pat. No. 4,360,875 A (Behnke) can similarly leave a passenger standing if an acceptable match cannot be found. This can occur even if a car is available to take passengers. Moreover, Behnke's method requires that the geographic area to be served is partitioned into a grid, and the grid squares are used to inform the matching process. This procedure is prone to inefficiency and error because cities and landscapes are not well modeled by rectangular grids.

U.S. Pat. No. 5,272,638 A (Lineberry, et. al.) proposes a method for optimizing travel along a route containing a series of waypoints ("destinations"), but does not support the notion of a passenger or other load (e.g. cargo) that must be picked up at one location and dropped off at another, and is thus inapplicable to a situation in which persons or goods are transported from Point A to Point B, with Point B necessarily coming later than Point A.

The invention of U.S. Pat. No. 5,604,676 A (Penzias) reports a plurality of paths and prices to the passenger, who must pick one, entailing a certain complexity and delay.

U.S. Pat. No. 8,438,118 B2 (Ho) covers a method to improve transportation of "items or packages" by seeking a more efficient route, and by consolidating shipments. Ho's method requires "time attributes" to function, these being windows or ranges of time within which a package can be picked up or delivered, similar to Barnickel's "tolerances", and undesirable for the same reasons. At no point does Ho describe his system as being suitable for moving people rather than objects.

The academic literature contains a paper on efficient vehicle routing (Algorithms for Capacitated Vehicle Routing, Charikar et. al., SIAM J. Computing, Vol. 31, No. 3, pp. 685-682, hereafter "Charikar"). Charikar describes mathematical methods for minimizing the distance traveled by a vehicle delivering "pegs" from origins to destinations. Charikar's algorithms all are focused on reducing distance traveled by the delivery vehicle, but do not minimize either time or distance for the cargo ("pegs"). Charikar's methods all assume the vehicles will begin and end their journeys at the same place, which places this optimization problem into a category well recognized by persons skilled in the art of computer science as "NP-complete". Such problems are for all practical purposes mathematically impossible to solve for any but a small number of vehicles and pegs, which means Charikar's methods are impractical for any but a very small number of pegs.

BRIEF SUMMARY OF THE INVENTION

Certain aspects of preferred embodiments of the present invention are directed towards the allocation of vehicles among passengers such that the total time the passengers spend traveling, or the distance they cover, is minimized.

Certain aspects of preferred embodiments of the present invention may result in a reduced time or distance the vehicles must travel to serve them and/or costs accrued by the service.

Certain aspects of preferred embodiments of the present invention may cause passengers presenting rides that are easiest to efficiently serve to be served soonest, encouraging such passengers to continue patronizing the service.

Certain aspects of preferred embodiments of the present invention may cause passengers presenting rides that are approximately equally efficiently served, to be served with approximately equal dispatch.

Certain aspects of preferred embodiments of the present invention may permit the service providers to guarantee passengers that a ride ordered will result in a vehicle dispatched, provided an active vehicle is present with enough seats to accommodate all persons traveling together as part of that ride.

Certain aspects of preferred embodiments of the present invention may permit the service providers to schedule new rides at any point, dynamically re-allocating resources and re-routing vehicles in response to new ride requests, cancellations of existing rider requests, or "no-show" passengers.

Certain aspects of preferred embodiments of the present invention may permit the service providers to dynamically re-allocate resources and re-route vehicles in response to the unexpected addition or loss of a vehicle, such as that caused by a new vehicle coming available, or a working vehicle opting to go off duty.

Certain aspects of preferred embodiments of the present invention may permit a vehicle becoming available to immediately begin serving customers who had booked rides prior to that vehicle becoming available.

Certain aspects of preferred embodiments of the present invention may permit recovery from a situation arising when a vehicle bearing passengers is unable to complete its ride due to mechanical failure or other disability.

Certain aspects of preferred embodiments of the present invention may permit the provision of either a faster (premium) or slower (discount) service to different passengers.

Certain aspects of preferred embodiments of the present invention may permit the provision of a service that minimizes the time spent on one part of a passenger's journey, for example, the time spent waiting for a pickup.

Certain aspects of preferred embodiments of the present invention may permit the selection of an optimally efficient set of routes using combinations of money cost of a route, distance traveled a route, or time to travel along a route, or a set of routes.

Certain aspects of preferred embodiments of the present invention permit the selection of an efficient set of routes without requiring any routes to return to their starting point, thus avoiding intractable computational complexity when selecting routes.

In the following descriptions, certain specific details are provided to give an understanding of the invention. One skilled in the art will recognize that the invention may be practiced without one or more of the specific details, or with other methods, materials or components, etc. In other cases, well known components or operations are not described in the interest of clarity of exposition.

When reference is made to "an embodiment" or "one or more embodiments", it means that a particular structure, feature or method is included in at least one embodiment of the present invention. It does not necessarily mean the structure or feature or method is included in all embodiments. The particular structures, features, or methods here described may be combined in one or more embodiments. In particular, any description that makes use of a vehicle, passenger or hub may be understood to apply to any number of such vehicles or passengers or hubs.

In any case where either a masculine or feminine article of speech is used (he, she, him, her, his, hers, etc.), it is intended that the person(s) so referenced can be either male or female, without regard to the gender used to refer to him/her.

DETAILED DESCRIPTION OF PREFERRED EMBODIMENTS

Figure 22:
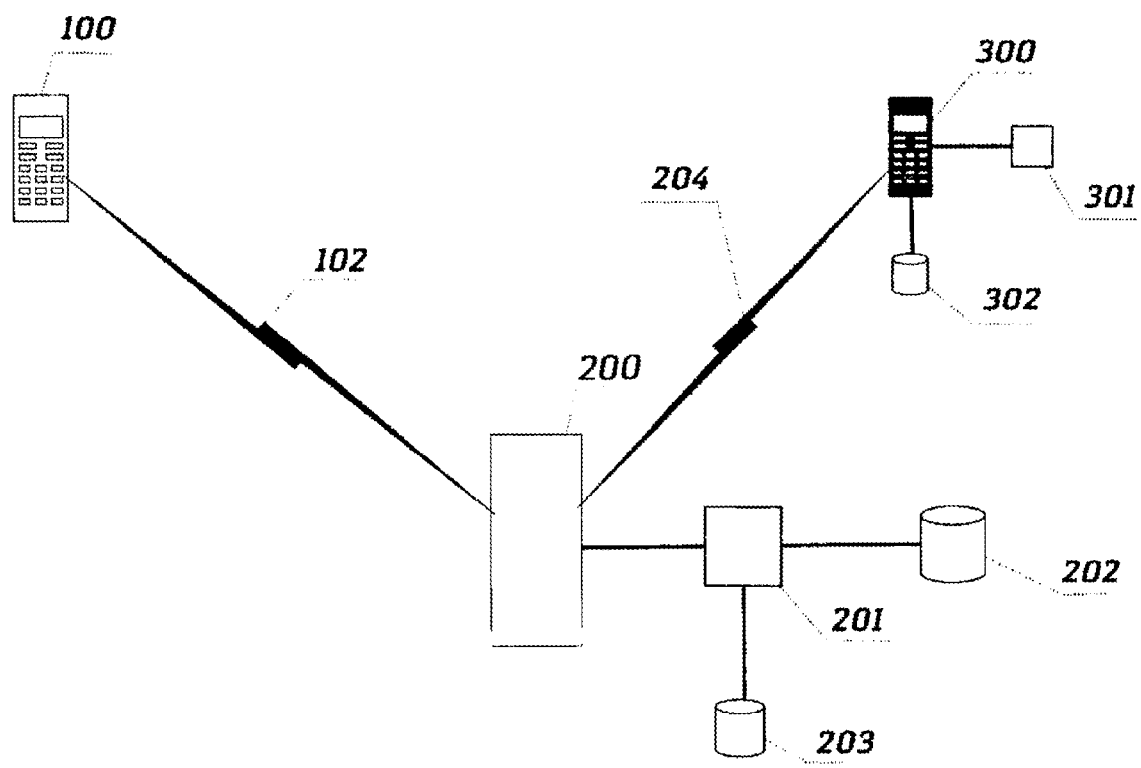
FIG. 22 is a schematic of certain components of the invention

Referring initially to FIG. 22, there is shown a schematic diagram of a system suitable for implementing various aspects or embodiments of the present invention. It depicts:

[A] A party of travelers 100, numbering one or more persons, who know where they are and where they wish to go, and who have way to communicate 102 the origin and desired destination, and optionally the number of persons in the party, to a dispatch unit 200, and

[B] A dispatch unit 200, containing:
- A communications link 102 to parties of travelers 100, suitable for communication of origins and destinations of desired rides, and possibly numbers of persons in the party, and
- A non-transitory computer-readable storage device storing instructions for controlling a computing environment to perform a method 201 in a computing system for generating routes for transportation of parties of travelers 100 with known origins and destinations, and
- An electronic map 202 on computer-readable data storage media, containing information describing roads, highways, streets, and intersections, and of finding shorter or shortest, faster or fastest, and cheaper or cheapest routes between points in the map, and making the routes or information available to the routing method 201, and
- A data storage unit 203, such as a computer hard disk or other computerized storage media, or a connection to a computer with such media, and the data storage unit 203 being available to the routing method 201, and
- A wireless communication interface 204 with vehicle consoles (to be described in [C]), and

[C] A vehicle and driver, comprising:
- A vehicle console 300, comprising a computer, smart phone, tablet computer, or other computing device, and an interface to the vehicle operator, through which the operator may enter or receive information, and
- A locating device 301, such as a Global Positioning System (GPS) unit, with a data interface to the vehicle console 300, and
- A data storage unit 302, with a data interface to the vehicle console 300, and
- A wireless communications interface 204 with one or more dispatch units 200.

DEFINITIONS AND UNDERSTANDINGS

In one or more embodiments, a passenger 100 may be a member of a party of travelers 100, which may include any number of passengers 100 greater than zero, and a "party of travelers" 100 may include one or more than one passengers 100, and the terms "passenger" 100 and "party of travelers" 100 may be used interchangeably.

In one or more embodiments, "enroute" shall mean for any given passenger 100 any point in time or space at which that passenger 100 has yet to arrive at his destination, and for any given vehicle "enroute" shall mean any point in time or space at which the vehicle has not yet completed serving all passengers 100 it is dispatched to serve.

In one or more embodiments, a "vehicle console" 300 may mean a computer, smart phone, tablet computer, or other computing device, the device being equipped with an interface by which an operator of the vehicle may enter or receive information, and also equipped with a wireless communication interface 204, and possibly also equipped with a locating device 301, such as a global positioning system (GPS), and possibly also equipped with a data storage unit 302, such as a computer hard disk or FLASH memory.

In one or more embodiments, a "vehicle" or "car" may be understood to mean a wheeled motor vehicle and driver, equipped with a vehicle console 300. In some embodiments, "vehicle" and "vehicle console" may be used interchangeably, but in all such cases it is assumed that the console in the instant case is borne upon the vehicle in the instant case.

In one or more embodiments, a "driver" of a vehicle may mean either a person driving a vehicle as such is usually understood, or a machine capable of guiding and controlling a vehicle.

In all embodiments, "booking" a ride is understood to mean the process of a passenger 100 notifying a service with a dispatch unit 200 that the passenger 100 desires transportation from a given origin to a given destination, perhaps for a given number of persons, and of the service recording the particulars of that request. A "ride" is defined as the combination of origin and destination of the traveling party 100, and possibly also the number of passengers 100 in the traveling party 100.

In one or more embodiments, "dispatching" a ride may mean the process of a service with a dispatch unit 200 notifying a given vehicle 300 by way of the vehicle console 300 that that vehicle 300 is required to serve a certain ride, and of either the vehicle's console 300 or the dispatch unit 200, or possibly both the vehicle console 300 and the dispatch unit 200 recording the particulars of the ride; and the dispatch unit 200 possibly recording the identity of the vehicle 300 serving that ride.

In one or more embodiments, "embarking" a passenger 100 may mean the passenger physically boarding the vehicle 300, and the vehicle 300 notifying the dispatch unit 200 that the embarkation has occurred, and the dispatch unit 200 recording the facts of the embarkation. Likewise, "disembarking" a passenger 100 may mean the passenger 100 physically leaving the vehicle 300, and the vehicle 300 notifying the dispatch unit 200 that this has occurred, and the dispatch unit 200 recording the facts of the disembarkation. The phrase "picked up" shall be synonymous with "embarked", and the phrase "dropped off" shall be synonymous with "disembarked".

In one or more embodiments, a "travel metric" means a measure of time, distance, or money, and "travel cost" is the sum of one or more travel metrics along a route, possibly but not necessarily including money.

Each travel metric is expressed in one "unit of measure", which is defined to be a unit of distance (for example, kilometers) or of time (for example, minutes) or of money (for example, dollars).

"Passenger travel cost" for a given passenger 100 is the sum of one or more travel metrics accrued before that passenger 100 arrives at his destination.

"Vehicle travel cost" is the sum of one or more travel metrics accrued by a vehicle 300 between a given point and a subsequent point at which a passenger or passengers 100 are embarked or disembarked.

In one or more embodiments, we may choose to define a "hub" as a point on earth with known location, which has facilities for vehicles 300 to enter, leave, embark, and disembark passengers 100, and which is an appropriate place for passengers 100 to await a vehicle 300 to transport them.

In one or more embodiments, we may choose to describe a route as a "feasible route". For any feasible route for a given party of travelers 100, all of the following are true, except when otherwise specified herein:
  (1) The party 100 is to be embarked at its origin;
  (2) The party 100 is to be disembarked at its destination;
  (3) Disembarkation of a given party 100 occurs after embarkation of the given party 100; and
  (4) At least one of the following is true for any given party 100:

(a) The party 100 is to be disembarked from the same car 300 that embarks it, or (b) The party 100 is to be disembarked at a hub, and subsequently embarked upon another vehicle 300, the vehicle 300 traveling on a feasible route.

An "infeasible route" shall be defined as a route which violates one or more of these rules, except when otherwise specified herein.

In one or more embodiments, "route" may be used interchangeably with "feasible route", except where specifically noted. In particular, a "route set" or "set of routes" shall mean a set of one feasible route, or more than one feasible routes.

In one or more embodiments, routes may be described as "better" or "best", which means "having the lesser total travel metric" or "having the least total travel metric" compared to other routes. For example, if the relevant travel metric is time, the "best" route is that which can be completed in the least time; if the relevant metric is distance, the "best" route is the shortest; and if money costs are being used. "best" means cheapest.

Routes will be diagrammed by labeling the pickup point with an uppercase letter (e.g. 'A') and the drop-off with the same letter in lower case (e.g. 'a').

Cars 300 will be labeled with an uppercase 'X' followed by a number, e.g. 'X1'.

Routes may be described by connecting cars 300 to pickup and drop-off points by arrows ('→') in order, for example, a ride in which car X1 picks up passenger(s) 100 at point (A) and drops them off at point (a) can be written as X1→A→a.

A sequential set may be described as a set of origin(s) and destination(s) transited by a vehicle in order (see, for example, FIGS. 2B and 3B) and further including street information and a location of a carrying vehicle, and said sequential set optionally excluding any origins of any included parties that have previously been embarked upon, but not disembarked from, said carrying vehicle, and each said sequential set having the properties that:

(i) any vehicle transiting said set in order shall transit every said origin and every said destination in said sequential set, and said vehicle shall never transit any said destination of any particular included party prior to transiting said origin of the same included party, and that (ii) each said included party that has previously embarked upon, but not disembarked from, a particular vehicle shall be included only in a sequential set that de rates said particular vehicle as the carrying vehicle for that sequential set.

A party 100 being picked up at point (A) may be referred to as passenger(s) (A) or party (A), and so on for (B), (C), etc. When it is necessary to designate a party (A) disembarking at a hub, this may be rendered (particularly in tables) as (A–), when party (A) embarks at a hub, it may be rendered as (A+). This notation may of course be extended to parties (B), (C), (D), etc.

In one or more embodiments, we may find it useful to define a "solo" route as being the best feasible route that a party 100 can travel, assuming that no other parties 100 are traveling. For example, if parties 100 (A), (B), and (C) need rides at the same time, and cars (300) X1 and X2 are active, and the metric employed is time, the solo route for party (A) is simply the feasible route that will carry party (A) to its destination in the shortest time, without regard to the other parties. Likewise, parties 100 (B) and (C) also have solo routes, which may or may not be compatible with party (A)'s solo route (they may use the same car 300, for instance).

In one or more embodiments, a "direct route" may be the best path between a given passenger's origin and destination. A direct route lacks a carrying vehicle and therefore is not a feasible route.

Both solo routes and direct routes may also be described using travel metrics other than time.

In one or more embodiments, "direct efficiency" may be defined as a ratio between the passenger travel metrics measured along a given passenger's direct route, to vehicle travel metrics taken along a feasible route including that passenger.

In one or more embodiments, "solo efficiency" may be defined as a ratio between the passenger travel metrics measured along a given passenger's solo route, to vehicle travel metrics taken along a feasible route including that passenger.

PARTICULAR EMBODIMENTS

Certain of the embodiments include use of a given method (FIG. 22, 201) used to find a suitable or superior route given a vehicle(s) 300, passenger(s) 100 and respective origin(s) and destination(s), and map(s) 202.

In one or more embodiments, the method may incorporate one or more vehicles 300 equipped as described in section [C] of the description, and a dispatch unit 200 as described in section [B] of the description.

In one or more embodiments, it is assumed that one or more vehicles 300 are available for service, and that they have recently communicated their positions to the dispatch unit 200. Moreover, it is assumed that one or more parties of travelers 100 have (or will have) communicated with the dispatch unit 200, informing it of their origin, their desired destination, and their wish to travel.

In some embodiments, the party of travelers 100 may further inform the dispatch unit 200 of the number of travelers in the party 100, or other information affecting routing, such as the party's status as a premier customer requiring swifter service.

In one or more embodiments, the routing method 201 may use the information received from the traveling parties 100, the positions of the vehicles 300, and the map 202 information to produce one set of feasible routes or more than one sets of feasible routes, with each feasible route within any such set of feasible routes connecting at least one traveling party 100 to a vehicle 300. In one or more embodiments, the routing method 201 shall choose one set of feasible routes as superior to the others, and the dispatch unit 200 shall communicate each feasible route within that set to the vehicle 300 associated with that feasible route.

In one or more embodiments, the routing method 201 may consider a set of routes to be superior if it produces the lowest total passenger travel cost, total passenger travel cost being the sum of passenger travel costs along all feasible routes in set of routes.

In one or more embodiments, the routing method 201 may consider a set of routes to be superior if it produces the lowest total vehicle travel cost, total vehicle travel cost being the sum of all vehicle travel costs along all feasible routes in the set of routes.

In one or more embodiments, the routing method 201 may add or combine total passenger travel costs and total vehicle travel costs, and deem any route set with the lowest combined travel cost to be superior to other route sets.

In one or more embodiments, the routing method 201 may calculate the overall direct efficiency of all routes in a route set, and deem any route set with the highest overall direct efficiency to be superior to other route sets.

In one or more embodiments, the routing method 201 may calculate the overall solo efficiency of all routes in a route set, and deem any route set with the highest overall solo efficiency to be superior to other route sets.

Embodiment 1

Figures 1A, 1B:
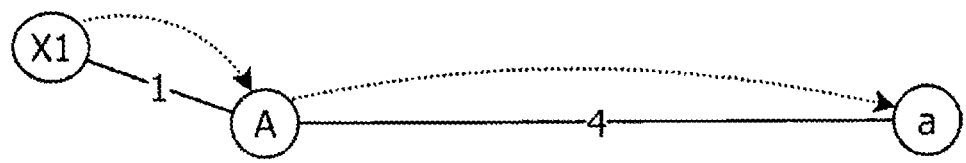
FIGS. 1A & 1B describe a route involving one car and one passenger, and serve principally to illustrate the notation used in FIGS. 1A/1B-FIGS. 21A/21B.

FIGS. 1A & 1B illustrate an example of a simple such embodiment, and serve to elucidate the notation that will be used in subsequent embodiments. For this example, the routing method is using time as the travel metric, and using the criteria of least passenger travel cost to select the best route set. In this case, a single car X1 is available to serve a single party at point (A), traveling to point (a). The feasible route is indicated by a dotted, curved line, and the travel metrics along the feasible route (be they time, distance, or money) are numeric labels embedded in the straight, solid lines. The route shown can be defined as X1→A→a, indicating a feasible route served by car X1, proceeding to point (A), then to point (a). The leftmost column in Table 0 (headed "Position (X1)", for the position of car X1), read from top to bottom, will perforce have entries X1, A, and a, in that order. To the right of that column are a set of columns headed with the "name" of the traveling party. In this case only one passenger exists, passenger (A). Beneath that header are numbers that indicate the amount of the given travel metric that the passenger will have spent enroute up to reaching this point. For example, the first entry under column A is 0, which is the amount of time that passenger (A) is forecast to have spent enroute when the car is at point (X1). The next entry in column A is 1, which is the amount of time passenger (A) is forecast to have spent enroute when his vehicle arrives at point (A), and the last entry is 5, the total amount passenger (A) will spend enroute before his vehicle arrives at a, which is his destination, after which point passenger (A) will not accrue any further time. Another column shows the time spent enroute for the vehicle, which in this simple example happens to be equal to the time enroute of the passenger. The sum of the passenger's times (or other travel metric) spent enroute, plus in some cases the vehicles time(s) enroute, are used to select superior sets of feasible routes in some embodiments. In some embodiments, either the vehicle(s) time or the passenger(s) time may not be used to calculate fitness of a feasible route, in which case it may be omitted. In this example, only one feasible route exists, and the vehicle will be dispatched accordingly. In such an embodiment, the method may use travel metrics other than time.

Embodiment 2

Figures 2A, 2B:
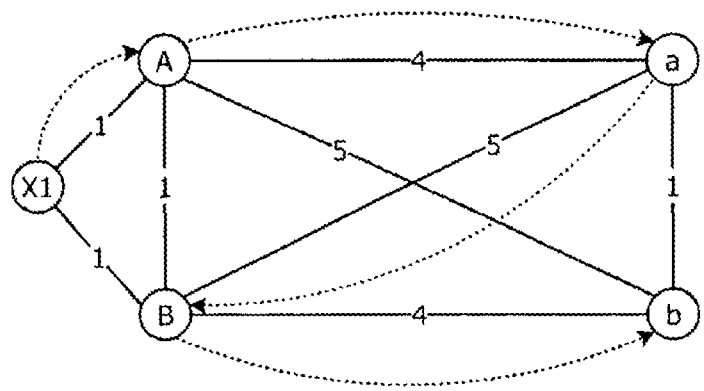
FIGS. 2A & 2B/FIGS. 3A & 3B describe the optimization of a route involving a single car and two passengers.
Figures 3A, 3B:
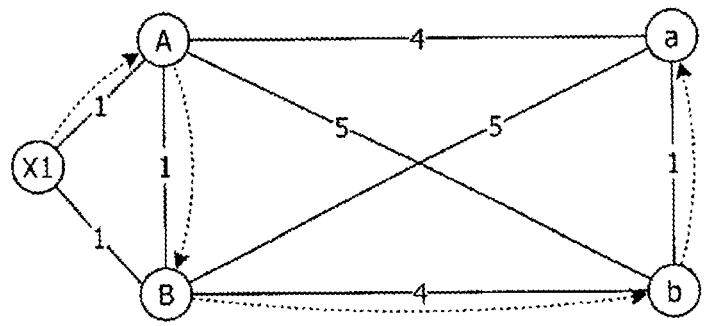

FIGS. 2A and 3A are diagrams illustrating another example of an embodiment. For this example, the routing method is using time as the travel metric, and using the criteria of least passenger travel cost to select the best route set. In this example, a passenger at point (A) in FIG. 2A notifies a service bearing a dispatch unit that he desires to move to point (a), and likewise a passenger at point (B) notifies the same dispatch unit of his desire to go to point (b). The dispatch unit, having an electronic map covering the area and showing estimated travel times between points therein, and having received location information from a vehicle X1 at the point X1, plots a preliminary feasible route to serve both passengers. This feasible route may involve car X1 picking up the first passenger at point (A), requiring in this example one minute to arrive; then to proceed to point (a) to drop him off, requiring four additional minutes; then to point (B) to get the second passenger, using an additional five minutes; then to point (b) to disembark him and complete the task, taking an additional four minutes. The passenger (A) starting at point (A) would be enroute for a total of five minutes, and the passenger (B) starting at point (B) would be enroute for a total of 14 minutes, for a total of 19 minutes enroute for both passengers. Such a feasible route may hereafter for brevity be described thus:

X1→A→a→B→b.

The times required are shown in FIG. 2B.

In FIG. 3A, the system has computed a different feasible route for the same two rides, X1→A→B→b→a, requiring seven minutes for the passenger starting at point (A) and six for the passenger starting at point (B), a total of 13 minutes, as shown in FIG. 3B In this case, the second feasible route would be deemed superior on the grounds of its smaller total passenger costs enroute, a superior set of feasible routes would be generated (in this case the set will have only one feasible route), and the vehicles would be dispatched accordingly.

Embodiment 3

Figures 4A, 4B:
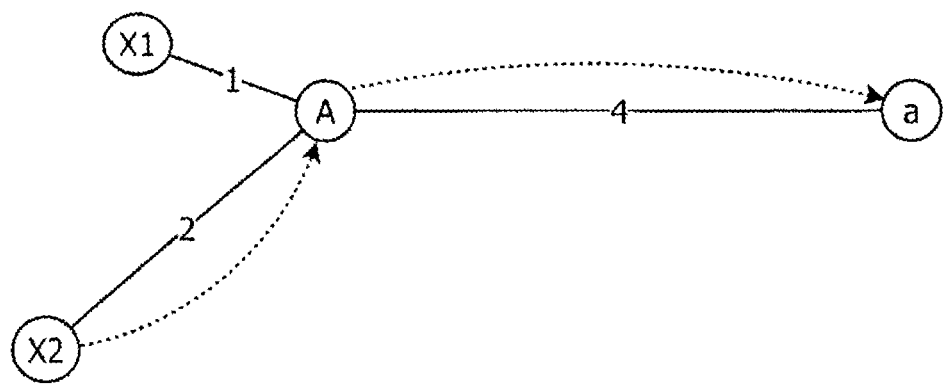
FIGS. 4A & 4B/FIGS. 5A & 5B describe the optimization of a route involving two cars and a single passenger.
Figures 5A, 5B:
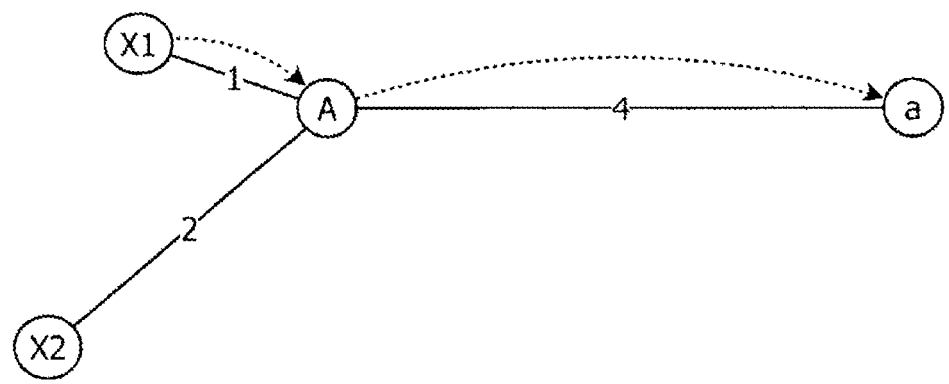

FIGS. 4A and 5A are diagrams illustrating another example of such an embodiment. For this example, the routing method is using time as the travel metric, and using the criteria of least passenger travel cost to select the best route set. In this example, a passenger at point (A) notifies a service bearing a dispatch unit that is itself in communication with two vehicles that he desires to move to point (a). The dispatch unit, using its maps and methods as previously described, generates a feasible route using car X2 (FIGS. 4A&4B). It then generates another feasible route involving car X1 (FIGS. 5A&5B). The method calculates that the passenger will suffer a smaller time enroute if he is carried by car X1 rather than car X2. A set of feasible routes is generated, in this example containing only aforesaid single route, and car X1 is therefore dispatched to transport the passenger, and car X2 is not involved. In such an embodiment, the method may use travel metrics other than time.

Embodiment 4

Figures 6A, 6B:
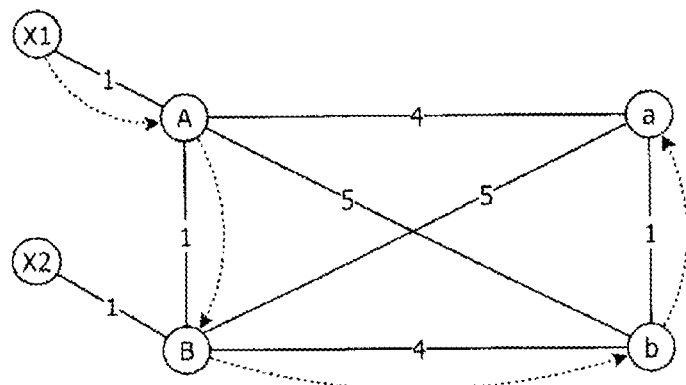
FIGS. 6A & 6B/FIGS. 7A & 7B describe the optimization of a route involving two cars and two passengers.
Figures 7A, 7B:
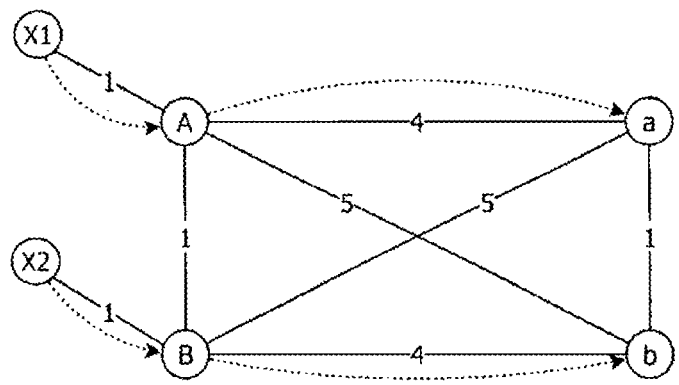

FIGS. 6A & 7A are diagrams illustrating another example of such an embodiment. For this example, the routing method is using time as the travel metric, and using the criteria of least passenger travel cost to select the best route set. In this example, two passengers at points (A) and (B) notify a service with a dispatch unit that they wish to travel to point (a) and point (b), respectively. The service is in contact with two cars, X1 and X2. The service may initially choose the set containing only feasible route X1→A→a→B→b, that is, with car X1 handling both passengers and with car X2 uninvolved. This method yields a total time enroute of 13, as shown in FIG. 6A and described in FIG. 6B. The service may also choose another set of feasible routes as in FIG. 7A and FIG. 7B, X1→A→a and X2→B→b, yielding total time enroute of 10, which would be deemed superior to the first route set's total of 13. The second route set would be chosen, and the vehicles would be dispatched to carry each of their respective passengers, X1 carrying passenger (A) and X2 carrying passenger (B). In such an embodiment, the method may use travel metrics other than time.

Embodiment 5

In one or more embodiments, the method may examine money costs of travel along a given route and choose as superior a route yielding a lower sum total money cost for all passengers and vehicles. Here again, we can use FIGS. 2A&2B and FIGS. 3A&3B, with the travel metric of time replaced by the travel metric of money costs accrued enroute. This may be useful in dealing with, for example, toll roads or tolled bridges. The method would again select the set of feasible routes with the lowest sum of relevant travel metrics, and dispatch the vehicles accordingly.

Embodiment 6

Figures 8A, 8B:
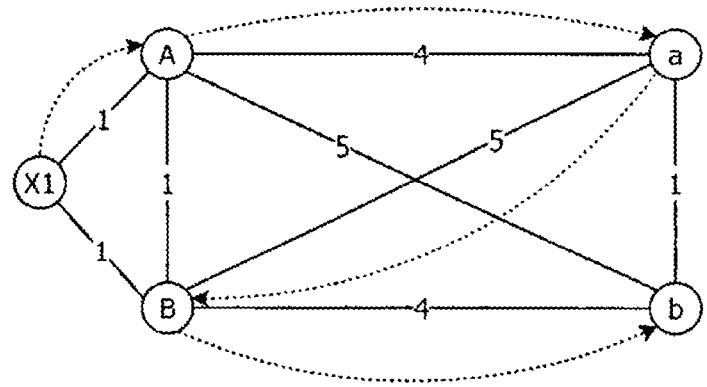
FIGS. 8A & 8B/FIGS. 9A & 9B describe the optimization of a route involving two cars and two passengers, in which one of the passengers is given premium service.
Figures 9A, 9B:
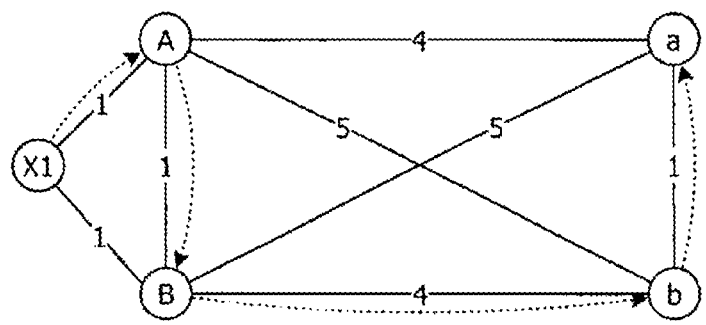

In one or more embodiments, the method may choose to weigh the time spent by a given passenger more heavily than the time spent by another. For example, if a given passenger has paid for premium service, the method may choose to count every minute he spends enroute five times, effectively weighting his time by a factor of five. The method may then choose a set of feasible routes having a lower sum of passenger travel time for all persons traveling. FIGS. 8A and 9A illustrate such an example. In this example the time enroute of the passenger starting at point (A) is multiplied by a factor of 5, as shown in FIGS. 8B and 9B. The superior feasible route set (in FIGS. 8A and 8B) shall be chosen on the basis of lower total (weighted) time enroute, and the vehicles dispatched accordingly. As in other embodiments, the method may use travel metrics other than time. Alternatively, such an embodiment could Embodiment 7

In one or more embodiments, the method may convert between units of money, distance, or time, and choose a set of feasible routes having a lower sum total of whatever travel metric is in use. For example, the provider may choose to define ten dollars as being worth exactly one hour. For a route crossing a bridge charging a toll of five dollars, one half hour is added to the time required to cross that bridge for the purposes of the method. To give another example, if the method is using units of distance, and sets one kilometer equal to one dollar, the five dollar bridge toll is converted to five kilometers, which is added to the distance along that leg for purpose of computation of sum total of distance enroute. The method will deem superior any set of feasible routes having a smaller sum total of whatever travel metric is in use, and the vehicles would be dispatched accordingly.

Embodiment 8

In one or more embodiments, the method may choose to weight certain portions of the journey more or less heavily than others, by multiplying or dividing the travel metric used along that portion by some number. For example, the method may weight time spent waiting for a vehicle to arrive twice as heavily as time spent riding in the vehicle, and would multiply such waiting time by a factor of two (or some other value), while time spent in the vehicle is unchanged. The method would sum the time for all passengers served, and choose a superior route set on the basis of lesser sum total time enroute. To take another example, the method may determine that costs delivering over dirt roads are higher than costs over paved roads, and would multiply money costs of traveling over such roads by a factor of (for example) 1.5, converting costs into time on an hours-per-dollar basis, and adding the time so derived to the time enroute of all other passengers and/or vehicles served, and choosing a superior route set on the basis of lesser sum total time enroute, and dispatching the vehicles accordingly. In such an embodiment, the method may use travel metrics other than time.

Embodiment 9

Figures 10A, 10B:
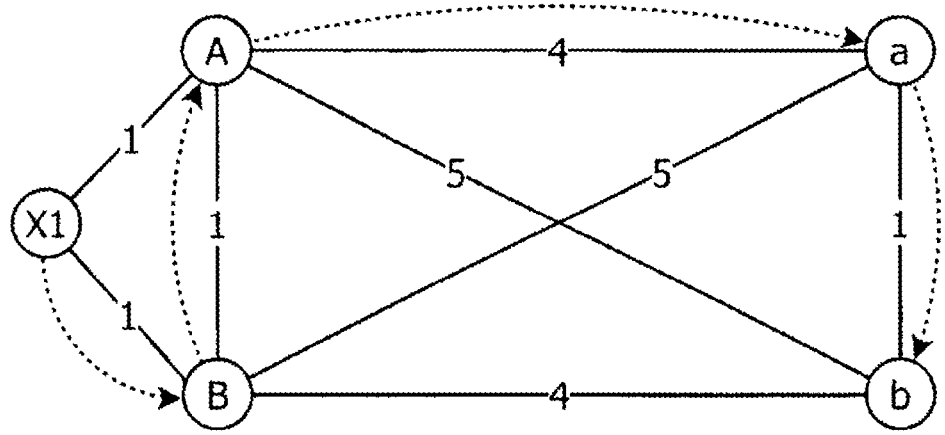
FIGS. 10A & 10B/FIGS. 11A & 11B describe the optimization of a route involving two cars and two parties of travelers, in which one party of travelers comprises two persons, and the other party of travelers comprises one person.
Figures 11A, 11B:
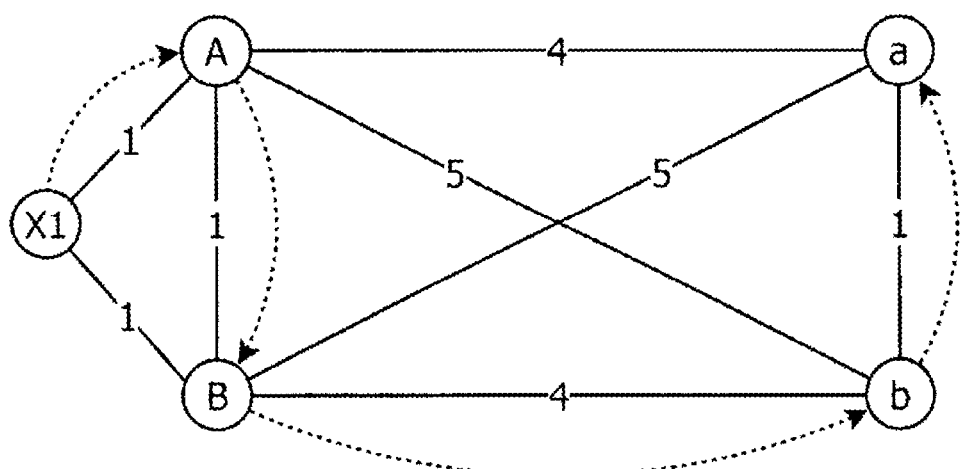

In one or more embodiments, the method may choose to multiply the time (or other suitable travel metric) enroute for a given party of persons traveling together (that is, from the same origin to the same destination) by the number of persons in the party, for the purposes of selecting a superior set of feasible routes. A route set with a lower total time enroute for all passengers would be deemed superior, and vehicles would be dispatched accordingly. This is illustrated in FIGS. 10A and 11A and FIGS. 10B and 11B. In this case, we assume that ride (B) comprises two people traveling together. The first feasible route set generated contains only route X1→B→A→a→b, which produces a total time enroute of 20 (FIG. 10B). The second feasible route set generated contains only route X1→A→B→b→a, which produces a total time enroute of 19 (FIG. 11B). The second route set, having a lower total time enroute, would be deemed superior, and the cars dispatched accordingly. In such an embodiment, the method may use travel metrics other than time.

Embodiment 10

In one or more of the embodiments, the method may choose to include the time or distance covered by the vehicle (s) and driver(s), or money costs accrued by same, as it would the passenger(s), before choosing a route set on the basis of least total time or distance, as above. This may be useful in cases where the driver wishes to go off-duty at a particular location, in which case he would order a ride on his own vehicle, knowing that his desire to get to his own destination will be weighed against the passengers' desire to go to their own destinations. In this embodiment, the method will add the travel metric incurred by the driver along any given feasible route to that incurred by all passengers along the same feasible route, and that of any other drivers and passengers in the same route set, to yield a total of time or distance covered by the involved persons. The method shall deem superior any such route set having a lesser total than any comparable route set, and the vehicles would be dispatched accordingly. As in other embodiments, any travel metric or combination thereof may be utilized.

Embodiment 11

It may be a feature of one or more embodiments that passengers desiring rides that are approximately equally efficient (using the definition of "direct efficiency" given above) may tend to be served in approximately the same amount of time. This has the advantage of allocating the transportation resource fairly among passengers that are more or less equally profitable to serve. This can be seen in FIG. 2A and FIG. 3A, and described in FIGS. 2B and 3B The direct route for passenger (A) measures 4 by whatever travel metric is in use (that is, the distance between origin and destination is 4 units), and the direct route for passenger (B) also measures 4. Each of the passengers can be served along his respective direct route by a vehicle traveling along 5 units, so the efficiency of the passengers is equal at 0.8 (=4/5). The first route set chosen in FIG. 2A has passenger (A) arriving in 5 units of time and passenger (B) in 14 units of time, but after choosing a superior route set, their respective measures are 7 and 6 units of time, which are more nearly equal. This relative equality is a desirable side effect of the routing method.

Embodiment 12

Figures 12A, 12B:
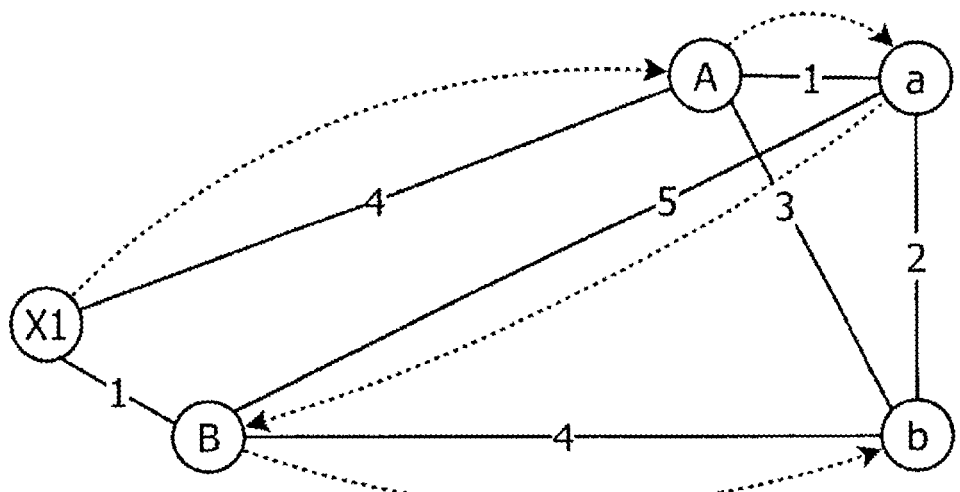
FIGS. 12A & 12B/FIGS. 13A & 13B describe the optimization of a route involving one car and two passengers, with one of the passengers requesting a ride that is not possible to serve as efficiently as that of the other passenger.
Figures 13A, 13B:
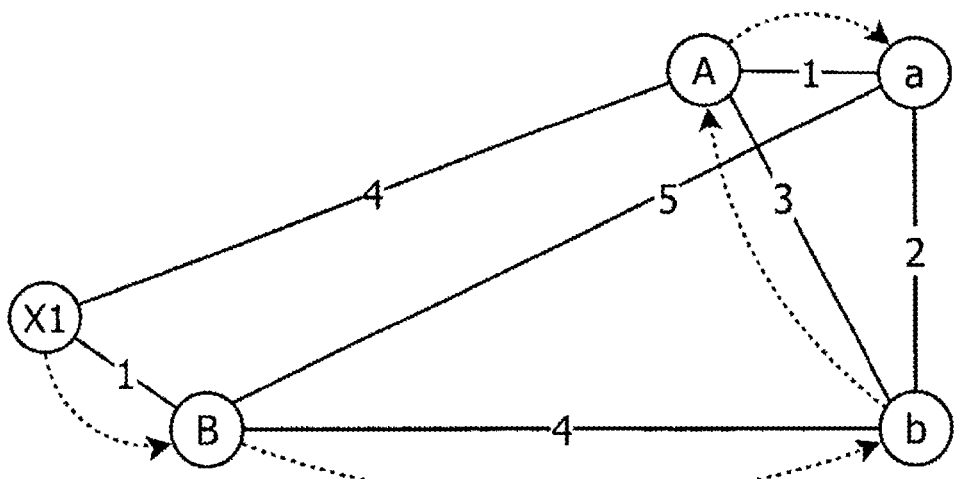

It may be a feature of one or more embodiments that a passenger that is less efficient (using the definition of "direct efficiency" given above) to serve is usually served later than other passengers. An example of such an embodiment is illustrated in FIGS. 12A and 13A, and described in FIGS. 12B and 13B. In this example, the two passengers at point (A) and point (B) may be carried by the car at X1, but one passenger is more efficient to serve: Passenger (A) has a direct route 1 unit long, and requires the car to be enroute for 5 units to serve it, yielding a direct efficiency of 0.20 (1/5), whereas B, with a direct route of 4 units and a vehicle time enroute of 5 has a superior direct efficiency of 0.8 (4/5). It should be noted that the route shown in FIG. 13A and described in FIG. 13B shows a lower sum total time enroute for both passengers (14=9+5) than does the route in FIGS. 12A and 12B (19=5+14), and also shows a larger time enroute (and later delivery) for the less efficient passenger (A). This is desirable because it provides better service to passengers that are more profitably served. In this embodiment, the route set having the smaller sum total time enroute would be deemed superior, and the vehicle(s) would be dispatched accordingly, harvesting the provision of faster service to the more efficient passenger as a desirable side effect of the routing method.

Embodiment 13

It may be a feature of one or more embodiments that a passenger may be carried to his destination even if his vehicle suffers a mechanical breakdown or other disability enroute. Consider for example a case in which a dispatch unit is in contact with two or more vehicles, X1 and X2. A party (A) books a ride from point (A) to point (a), and car X1 is dispatched to carry the party. After embarking passenger (A) at point (A), the vehicle suffers a disability at some point (Z) rendering it unable to continue. The vehicle may notify the dispatch unit of the disability and of its current position at point (Z), and the dispatch unit may record the fact that that particular vehicle is unable to carry passengers, and that the passenger has disembarked at point (Z). The dispatch unit, which may have previously recorded the fact of embarkation, may generate another ride for that passenger from point (Z) to point (a), and may route and dispatch the ride through one of the methods described in these embodiments, excluding the disabled vehicle from candidacy to carry the passenger. In this example, vehicle X2 may be routed and dispatched to handle the ride.

Embodiment 14

Figures 14A, 14B:
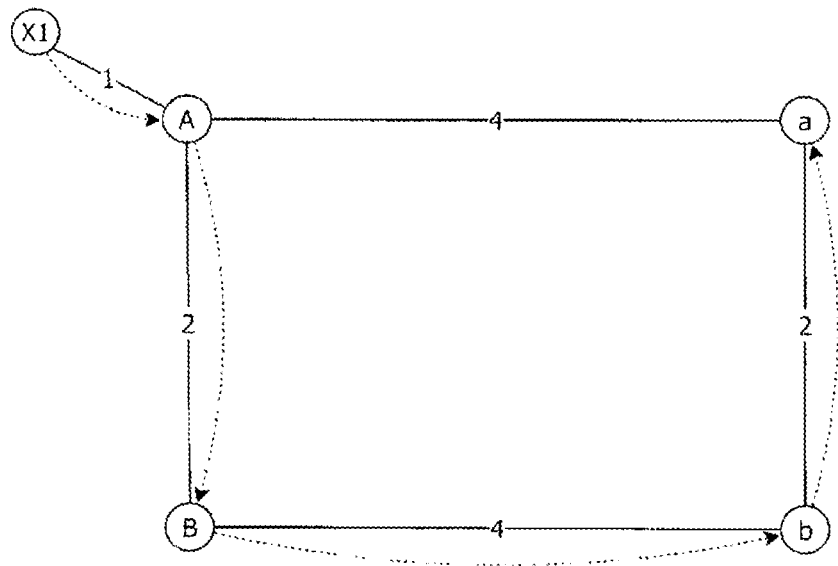
FIGS. 14A & 14B/FIGS. 15A & 15B/FIGS. 16A & 16B describe the optimization of a route involving two cars and two travelers, with one of the cars becoming available only after a passenger has already embarked upon the first car.
Figures 15A, 15B:
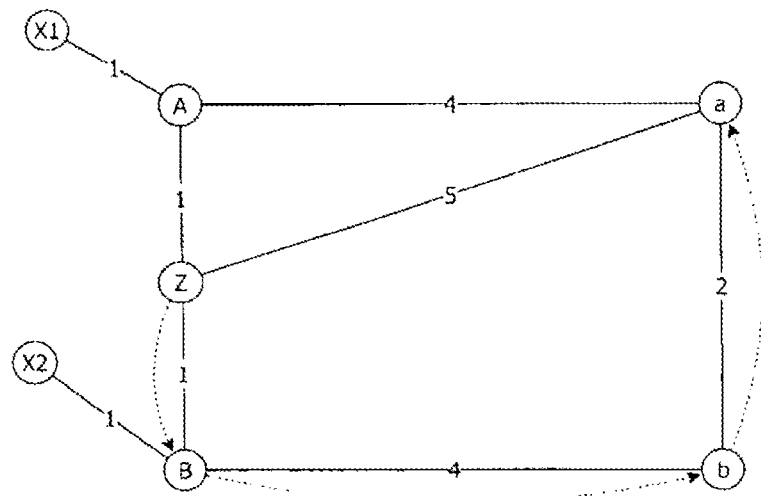
Figures 16A, 16B:
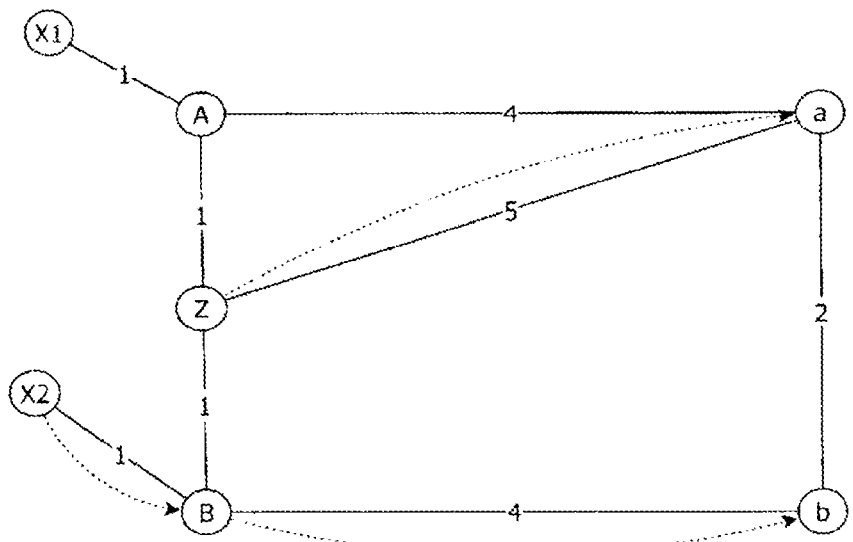

It may be a feature of one or more embodiments that a new vehicle becoming active may be used to deliver passengers who have already booked rides and have had those rides dispatched and/or embarked when the second vehicle becomes active. FIGS. 14A, 15A and 16A, along with FIGS. 14B, 15B and 16B illustrate an example of such an embodiment. In FIG. 14A, passenger (A) and passenger (B) have booked rides to point (a) and point (b) respectively, and car X1, the only car available, has been dispatched to serve them. The initial routes are as described in FIG. 14B. Car X1 embarks passenger (A) and begins traveling to point (B). When it is at point (Z) [see FIG. 15A], a second car X2 becomes available, whereupon the dispatch unit is faced with a choice of using X1 to carry both riders, as originally planned, or to employ car X2 to carry passenger (B) [passenger (A) is already on board car X1]. This situation may be reduced to that shown in FIGS. 15A and 16A. The dispatch unit may initially calculate the sum of times enroute from the moment at which car X1 is at point (Z) forward for all passengers if car X1 is used to carry both rides as originally planned. This circumstance is shown in FIGS. 15A & 15B, and shows that total times enroute for both passengers from that moment forward (that is, not counting time already accrued) add up to 12 units [=7 for passenger (A)+5 for passenger (B)]. The dispatch unit may generate another set of feasible routes from the same moment forward, using car X2 to transport passenger (B), and as shown in FIGS. 16A and 16B, this route will produced a sum of time enroute from that moment forward of 10 units (=5 for A+5 for B). In such an example, the method will deem the second route set to be superior, and will direct car X1 to change directions at point (Z), proceeding directly to point (a) to disembark passenger (A), and X2 will be directed to point (B) to embark passenger (B), then to point (b) to disembark him, completing both rides. It should be clear that the same method may be used to reroute vehicles that have not yet embarked passengers—the method may generate one or more feasible routes from the point at which the new vehicle becomes available, calculate total times enroute for all passengers for each route from that moment forward, select a winning route set based on lowest sum total time enroute from that moment forward, and dispatch the vehicles accordingly. As in other embodiments, the method may also employ travel metrics other than time.

Embodiment 15

Figures 17A, 17B:
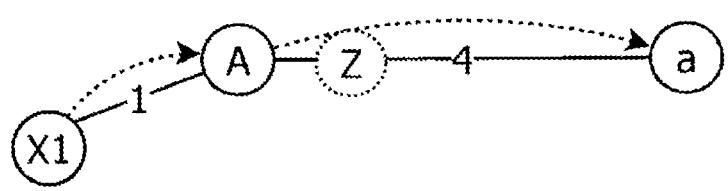
FIGS. 17A & 17B/FIGS. 18A & 18B/FIGS. 19A & 19B describe the optimization of a route involving one car and two passengers, in which one of the passengers does not book service until after the other passenger has embarked upon the car.
Figures 18A, 18B:
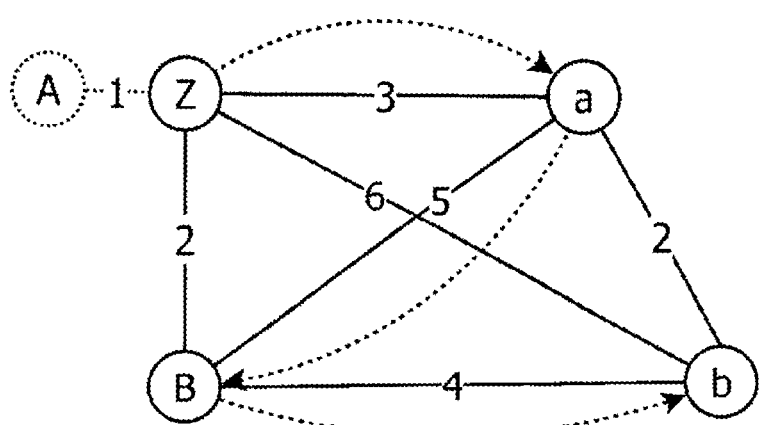
Figures 19A, 19B:
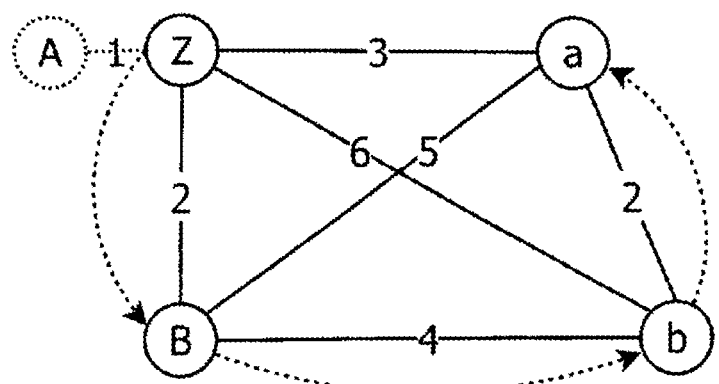

It may be a feature of one or more embodiments that a new ride unexpectedly booked by a heretofore unknown passenger may be handled by an active vehicle, perhaps even one already containing passengers on other rides. Consider an example shown in FIG. 17A (likewise described in FIG. 17B), in which car X1 has been dispatched to carry a passenger from point (A) to point (a), passing an invisible point (Z) on the way from point (A) to point (a). FIG. 18A shows the situation when passenger (A) has already embarked at point (a) and the vehicle has reached point (Z), at which time a second passenger books a ride from point (B) to point (b). The dispatch unit may then calculate any feasible routes beginning at point (Z). Two such routes are shown in FIGS. 18A and 19A, and they are likewise described in FIGS. 18B and 19B. In this example, the method will choose the routes in FIG. 19B, Z→B→a→b as being the best of these two feasible route sets on the grounds that it shows a lower sum total time enroute from point (Z) forward. Notice that passenger (B) will embark before passenger (A) disembarks in this example. As usual, the dispatch unit may use a travel metric other than time to make its calculations.

Embodiment 16

Figures 20A, 20B:
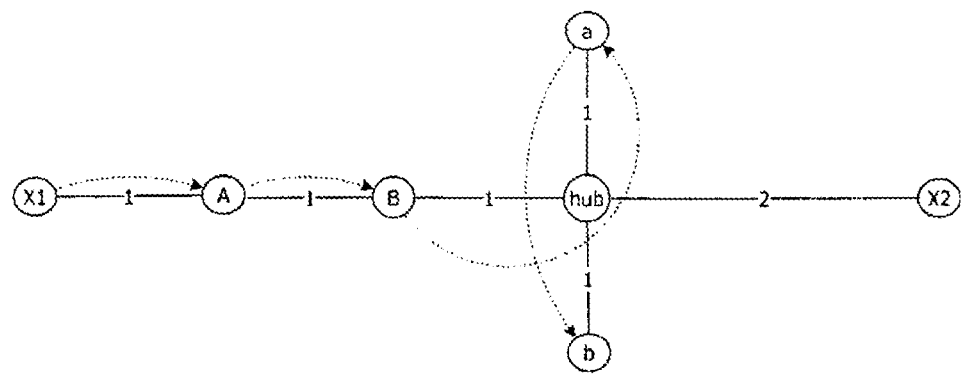
FIGS. 20A & 20B/FIGS. 21A & 21B describe the optimization of a route involving two cars and two passengers, in which a hub is utilized.
Figures 21A, 21B:
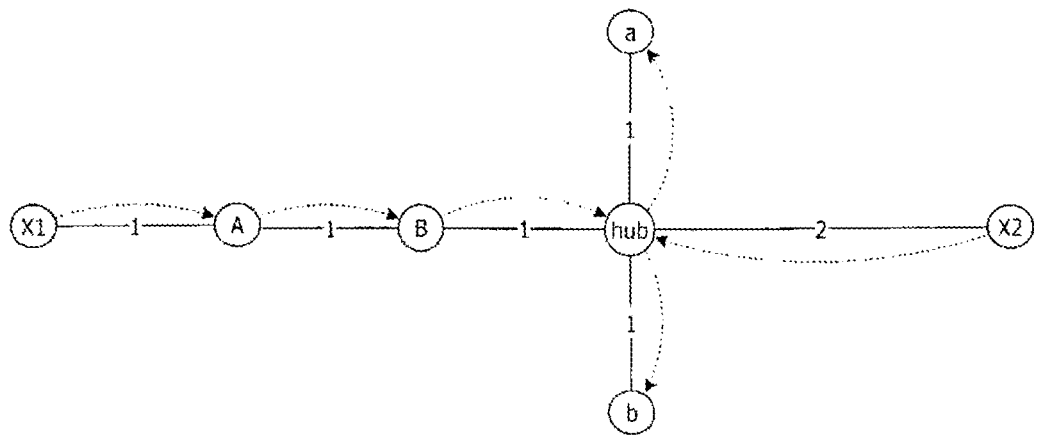

It may be a feature of one or more embodiments that a passenger may be delivered to a hub, at which point he will disembark and subsequently embark upon another vehicle to continue his ride. Such an embodiment is illustrated in FIGS. 20A and 21A, and described in FIGS. 20B and 21B. Assume for the sake of the example that two rides A and B are booked. FIG. 20A illustrates how such rides may be served without the use of a hub:

Route Set 1:
  Car X1 follows the route:

X1→A→B→(bypasses the hub)→a→(bypasses the hub)→b

Car X2 is not employed in this route set.

As FIG. 20B shows, this routing will require a total of 10 minutes enroute to be borne by the passengers, and 6 minutes by the vehicles.

Using a hub as illustrated in FIG. 21A, such rides may be served more efficiently as follows:

Route Set 2:

Car X1 follows the route:

X1→A→B→(stops at hub, disembarks party B)→a

Car X2 follows the route:

X2→(stops at hub)→(awaits party B traveling on X1 for 1 minute)→(embarks passenger B)→b As FIG. 21B shows, this routing will require a total of 8 minutes enroute to be borne by the passengers, and 8 minutes by the vehicles.

It should be clear that the vehicles and passengers may transit any number of hubs, and that any number of passengers may be handled in this manner. Moreover, the method may use any travel metric or combination of travel metrics in determining efficiency, and may weight the time spent by passengers or vehicles at the hub for use in calculating efficiency, or discount it entirely. Moreover, the method may or may not use the time, distance, or money spent by the vehicles in serving rides when calculating efficiency for such an embodiment. In the illustrated example, the travel metric used is time, and the method seeks to minimize passenger travel time, so the second route set would be deemed superior on the grounds of least total time enroute, and the vehicles dispatched accordingly. On the other hand, if the method seeks to minimize total vehicle cost, the first route set would be deemed superior to the second. As in other embodiments, the method may employ travel metrics other than time.

Embodiment 17

It may be a feature of one or more embodiments that the dispatch unit may be informed of the number of empty seats in a vehicle when the vehicle has no passengers, and may calculate and keep a count of empty seats at every point along a vehicles' proposed route. It may further be a feature of such embodiments that the dispatch unit will subtract one empty seat for each actual or forecasted embarkation of a passenger, and may add one empty seat for every such actual or forecasted disembarkation of a passenger. Moreover, it may further be a feature of such embodiments that the dispatch unit will require that a vehicle never has less than zero empty seats along any feasible route, and that any route violating this constraint is deemed infeasible.

Embodiment 18

In one or more embodiments, the method may consider a set of routes to be superior if it produces the highest overall direct efficiency, as such is defined above. FIGS. 2A and 3A, along with FIGS. 2B and 3B, illustrate an example of such an embodiment. The route set shown in FIG. 2A has a direct traveler cost of 8 units (4 for each of the parties) and a vehicle travel cost of 14 (the metrics along the length of the path taken by the single vehicle involved), a ratio of 8/14, or about 0.57. The route set in FIG. 3A also has a direct traveler cost of 8 (for the same reasons as in FIG. 2A), but a vehicle travel cost of 7, yielding a larger and therefore superior direct efficiency of 8/7 (about 1.14) for the second route set. In such an instance, the second route set may be chosen, and the vehicles dispatched accordingly. Note carefully that the highest overall direct efficiency is equivalent to the lowest ratio of the total vehicle travel cost to total direct traveler cost.

Embodiment 19

In one or more embodiments, the method may consider a set of routes to be superior if it produces the highest overall solo efficiency, as such is defined above. FIGS. 2A and 3A, along with FIGS. 2B and 3B, illustrate an example of such an embodiment. The route set shown in FIG. 2A has a sum of vehicle travel costs of 14 units. The solo traveler costs are each 5, taken along route X1→A→a for passenger (A) and X1→B→b for passenger (B), so the total of solo traveler cost is 10, and the ratio is 10/14 (about 0.714). In FIG. 3A, the travelers' solo costs are the same as in FIG. 2A, but the vehicle travel cost is now 7 and the ratio is 10/7 (about 1.428). The second route set would be deemed superior, and the vehicles dispatched accordingly. Note carefully that highest overall solo efficiency is equivalent to lowest ratio of the total vehicle travel cost to total solo traveler cost.

REFERENCE NUMERALS USED IN THE DRAWINGS

100—passenger, or party of travelers, with wireless communications device
102—wireless communications interface between passenger and dispatch unit
200—dispatch unit
201—routing method
202—electronic map
203—data storage unit
204—wireless communications interface between vehicle console and dispatch unit
300—vehicle console
301—positioning system
302—data storage unit

I claim:

1. A method for allocating vehicles to persons desiring transportation, the method comprising:
    a) wirelessly communicating vehicle information from at least one vehicle console to at least one dispatch unit, each said vehicle console being borne by a vehicle with a driver, and each said vehicle being suitably equipped for transporting persons, wherein said vehicle information including:
        i. a fitness or availability of said vehicle for service,
        ii. a location of said vehicle, and
        iii. an embarkation or disembarkation of traveling parties on or from said vehicle, and
    b) routing said vehicles by at least one dispatch unit, each said dispatch unit including:
        i. a non-transitory computer-readable storage device storing instructions for controlling a computing environment to perform a method in a computing system for generating routes of transportation of travelers with known origins and destinations, said route generating method comprising:
            (1) receiving street information from an electronic map, said electronic map covering the area occupied by said traveling parties and by said vehicles, and said street information including:
                (a) locations of intersections, and locations of endpoints of accessible ways, and
                (b) locations of accessible ways between said intersections and said endpoints of said accessible ways, and (c) at least one travel metric, each said travel metric being calculated along said accessible ways, (2) generating at least one feasible route, each said feasible route comprising:
  (a) information designating at least one party of travelers, each designated party of travelers being referred to hereinafter as an included party,
  (b) information designating one of said vehicles as a carrying vehicle for said feasible route,
  (c) the location of said carrying vehicles, and
  (d) one sequential set or more than one sequential set, said sequential set including said origins and said destinations of said included parties and said location of said carrying vehicle, and said sequential set optionally excluding any origins of any included parties that have previously been embarked upon, but not disembarked from, said carrying vehicle, and each said sequential set having the properties that:
    i. any vehicle transiting said feasible route shall transit every said origin and every said destination in said sequential set, and said vehicle shall never transit any said destination of any included party prior to transiting an origin of the same included party, and
    ii. each said included party that has previously embarked upon, but not disembarked from, a particular vehicle shall be included only in a sequential set that designates said particular vehicle as the carrying vehicle for that sequential set, (3) generating a plurality of route sets, each said route set comprising at least one feasible route, and each said route set having the properties that:
  (a) each of said parties of travelers are included in at most one feasible route within said route set, and
  (b) each of said carrying vehicles are included in at most one feasible route within said route set, and
  (c) each said feasible route within said route set shall include at least one of said traveling parties, (4) selecting one of said route sets as superior to the other generated route sets, and (5) extracting each said feasible route from said selected route set, and c) wirelessly communicating travel directions to each said vehicle console borne by said vehicle associated with said extracted feasible route, said travel directions including said information designating said included parties as included in said extracted feasible route, and d) dispatch said carrying vehicle to embark each said included party at the origin of said included party, to transport said included party to the destination of said included party, to disembark said included party at said destination of said included party, and to communicate the facts of said embarkations and disembarkations to said dispatch unit, e) wherein said superior route set is selected on the basis of least total predicted passenger travel cost for all included parties in said superior route set, said total predicted passenger travel cost comprising the sum of predicted passenger travel costs for each of the passengers in each of the traveling parties included in said superior route set.

\* \* \* \* \*